(12) United States Patent
Browne et al.

(10) Patent No.: US 9,682,015 B2
(45) Date of Patent: Jun. 20, 2017

(54) VIAL WITH FREE FLOAT VALVE FOR STERILE PHARMACEUTICAL

(71) Applicant: GE HEALTHCARE AS, Oslo (NO)

(72) Inventors: Martin Monteagle Browne, Oslo (NO); Marianne Weiby Wulff, Oslo (NO)

(73) Assignee: GE HEALTHCARE AS, Oslo (NO)

( * ) Notice: Subject to any disclaimer, the term of this patent is extended or adjusted under 35 U.S.C. 154(b) by 297 days.

(21) Appl. No.: 14/376,970

(22) PCT Filed: Feb. 27, 2013

(86) PCT No.: PCT/EP2013/053902
§ 371 (c)(1),
(2) Date: Aug. 6, 2014

(87) PCT Pub. No.: WO2013/127834
PCT Pub. Date: Sep. 6, 2013

(65) Prior Publication Data
US 2015/0297449 A1 Oct. 22, 2015

(30) Foreign Application Priority Data
Feb. 28, 2012 (EP) .................................. 12157231

(51) Int. Cl.
*A61B 19/00* (2006.01)
*A61J 1/14* (2006.01)
*B65D 51/00* (2006.01)
*F16K 24/04* (2006.01)

(52) U.S. Cl.
CPC .......... *A61J 1/1468* (2015.05); *A61J 1/1412* (2013.01); *B65D 51/002* (2013.01); *F16K 24/046* (2013.01)

(58) Field of Classification Search
CPC ............................. A61J 1/1412; A61J 1/1468
See application file for complete search history.

(56) References Cited

U.S. PATENT DOCUMENTS

| | | | |
|---|---|---|---|
| 2,879,784 A | 3/1959 | Cutter | |
| 3,738,361 A | 6/1973 | Price | |
| 3,969,092 A | 7/1976 | Huffman et al. | |
| 5,669,883 A * | 9/1997 | Scarfone | A61B 17/3417 604/158 |
| 6,255,101 B1 | 7/2001 | Rousseau et al. | |
| 6,695,004 B1 * | 2/2004 | Raybuck | A61M 5/1411 137/15.26 |
| 2004/0182986 A1 | 9/2004 | Feygin | |

FOREIGN PATENT DOCUMENTS

| | | |
|---|---|---|
| CN | 2695004 Y | 4/2005 |
| DE | 3543825 | 6/1986 |
| DE | 102005017985 | 10/2006 |

OTHER PUBLICATIONS

Machine translation of DE 35 43 825 to Korte.*
PCT/EP2013/053902 ISRWO Dated May 23, 2013.

* cited by examiner

*Primary Examiner* — Leslie Deak

(57) ABSTRACT

A package (10) for sterile fluids, such as contrast media. More particularly the invention relates to a package (10) comprising a container (20), a plug (40) and a float (15) residing in the container (20). The float (15) will close the exit (49) of the container before the container (20) is completely empty, preventing air from inadvertently being withdrawn from the container (20) when in the inverted position.

20 Claims, 6 Drawing Sheets

VIAL WITH FREE FLOAT VALVE FOR STERILE PHARMACEUTICAL

This application is a filing under 35 U.S.C. 371 of international application number PCT/EP2013/053902, filed Feb. 27, 2013, which claims priority to EP application number 12157231.7 filed Feb. 28, 2012, the entire disclosure of which is hereby incorporated by reference.

FIELD OF THE INVENTION

The present invention relates to a package. More particularly, the present invention is directed to a package for sterile pharmaceutical fluids, such as contrast media, used for medical perfusion.

BACKGROUND OF THE INVENTION

In the medical field, sterile fluids, such as medicaments, pharmaceuticals, sterile saline solutions and so on are frequently required. Such sterile fluids are typically supplied in rigid bottles or vials made of glass or plastic, or in collapsible containers.

Bottles for sterile fluids are typically closed by a rubber stopper inserted into the mouth of the bottle. The stopper is designed so that it can be pierced by a needle, an infusion spike, or the like, to allow the contents of the bottle to be withdrawn. In some designs the stopper can be removed to allow the contents of the bottle to be poured out. In order to hold the stopper in place different kinds of over-seals exist, such as a cap made of aluminium or similar thin sheet metal being crimped over the stopper and the upper part of the bottle. Over-seals can also be made of plastic. In order to gain access to the stopper, either to pierce it or remove it, the cap, or a part of this, is either partially or totally torn away. Commonly-assigned WO00/03920 describes an example of a package on the market comprising a plastic bottle, a stopper and a plastic cap. The cap comprises a cover member which supports the stopper and which has a region that is removable to expose the outer surface of the stopper.

When transferring sterile fluids from such known packages to a syringe, cartridge or an infusion pump the stopper is typically pierced with the needle of a syringe, or the fluid is transferred to another container by removing the stopper and pouring out the content or siphoning this with a tube (also called a straw or a quill). The use of a needle always poses a prick risk for the operator, in addition to the risk of transferring small particles from the stopper to the fluid to be injected in a patient. Further, whether pouring or siphoning out the contents, many operating steps are needed in order to transfer the bottle content to a syringe or a cartridge before the content can be administered to the patient. For example, commonly-assigned EP11193737.1 discloses a package comprising a container, a connecting plug and a cap. The connecting plug functions as an integrated connection for easily transferring the content of the container of the package, e.g. to a syringe, a tube or a cartridge.

When withdrawing a fluid from a package as those described above, whether by piercing the stopper with a syringe or by connecting a tube or syringe to a connecting plug, the container is typically hung in an inverted position, such that the opening is pointing downwards and the fluid is allowed to run out through gravity or with the aid of an infusion pump. A challenge when withdrawing the fluid is to see the fluid level in the container, i.e. the surface of the fluid, such that the operator can make sure that only fluid is withdrawn from the container and not a bolus of air. If the operator does not see the fluid level as the container is emptying there is a risk that air will get into the syringe or tubing which is being used in the withdrawal. If air gets into the syringe or tubing, the syringe or tubing cannot be used in the procedure, and a refilling is needed, causing wasted time, wasted tubing, loss of fluid and maybe also a need to reschedule the patient examination to another day.

U.S. Pat. No. 7,338,475 of Cardinal Health discloses a drip attachment for a medical fluid administration system including a container. The drip attachment provides a chamber for collecting fluid from the container as well as a shut-off float which acts as a valve to stop fluid flow when the fluid level in the attachment is too low and to allow fluid flow when there is sufficient fluid in the attachment. Additionally, the attachment generates an electrical field that attracts a float and a valve seat to shut off flow from the exit port of the container. The disclosed attachment must be attached to the administration system by coupling a first end to the container which includes a fluid reservoir of a product fluid, such as a flexible bag or contrast media bottle, and coupling the second end to a drip line leading to a syringe which is inserted into a patient's vasculature. Additionally, the drip attachment may require connection to an electrical source so as to generate the field enabling operation of the shut-off float. The additional steps required to incorporate the drip attachment into a fluid administration system must be carefully performed to ensure proper operation of the fluid administration system.

For the reasons stated above, and for other reasons stated below, there is a need in the art for an improved package for sterile fluids providing an improved functionality wherein the content of the container of the package can easily be transferred to a delivery device such as a syringe or cartridge ensuring that fluid only is transferred and not air, without the additional expense of, or the additional steps required to connect to, a separate attachment for the container.

SUMMARY OF THE INVENTION

With the package of the invention, the problem is solved by providing an alternative package for a sterile pharmaceutical product wherein the package includes a container for the fluid and a floating element, i.e. a float, which will close the exit of the container, shutting off the flow of the fluid from the container, before the fluid reaches a level near or corresponding to depletion and hence prevent air being withdrawn from the container. The floating element in the container can also serve as an aid to see the fluid level in the container.

DETAILED DESCRIPTION OF THE PREFERRED EMBODIMENTS

Figure 1:
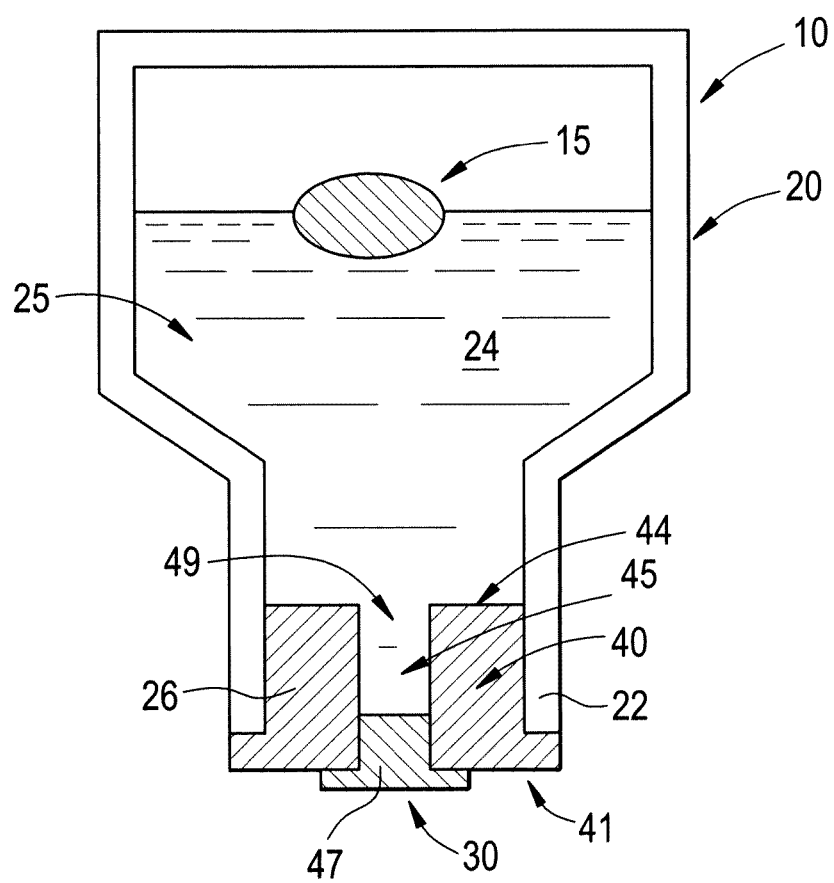
FIG. 1 schematically shows a cross-sectional view of a package of the present invention including a container, a connecting plug, a plug seal and a float.

The applicant has identified a package with improved functionality comprising a device functioning as an air lock, ensuring that air is not withdrawn from the container reservoir when withdrawing fluid from this. As with packages of the prior art, e.g. as described in WO00/03920 mentioned above, the package has multiple functionalities and has the possibility to be opened completely by removing the plug for pouring out the content or for siphoning this with a tube, straw or quill by an injector or other syringe. Alternatively, with the use of the connection plug, as described in EP11193737.1, the package can easily be connected with a variety of delivery devices for transferring the content of the container. The new package is easy to open, it preferably includes tamper-evident features to ensure it is not opened and used more than once, and it includes features ensuring the sterile liquid filled in it is kept sterile. The present invention is thus able to provide a package for a sterile pharmaceutical fluid from which the fluid may be withdrawn. The packages of the present invention are suitable for storing, transporting, and dispensing a pharmaceutical fluid such as a contrast media. The packages of the present invention limit the need for providing additional attachments to an openable container of a product fluid in order to ensure that no air will be drawn from the container among the product fluid as the product fluid is withdrawn from the container.

Hence in a first aspect, the present invention provides a package for a sterile pharmaceutical fluid. The package includes a container including a container body, the container body includes an annular container neck. The container body defines a fluid reservoir and the container neck defines an open container mouth in fluid communication with the reservoir. The package further includes a plug inserted into the mouth so as to span across the container neck and fluidically isolate the reservoir. The plug defines an elongate fluid passageway therethrough, the fluid passageway includes opposed first and second open ends in fluid communication with each other and with the reservoir. The package further includes a float residing inside the container, the float is sized and shaped to seal the second end of the passageway when a fluid held within the reservoir falls to a level near depletion, when passageway is positioned in underlying registry with the reservoir.

In one embodiment the package further comprises a cap overlying the plug, wherein this cap includes a removable portion which can be removed to gain access to the plug. The plug and the cap would then define a closure system for the container.

The container of the package of the invention may be a bottle or a vial and is preferably a bottle. Desirably, the container is made from a transparent material or a material sufficiently transparent so as to allow a user to see the fluid level and the float within. The container provides a reservoir for the fluid and is desirably delivered by the pharmaceutical manufacturer filled with a sterile pharmaceutical fluid and including the float. The container may be formed of glass or plastic, such as clear or opaque plastic, and may be either a rigid or flexible plastic container. The size of the container is e.g. from 3 ml to 50 000 ml, e.g. such as from 3-500 ml.

The float is a floatable element which will freely float at a certain level in the fluid in the container dependent upon the buoyance of the float. Preferably the float will float at the surface of the fluid making it easy to see the fluid level in the container. By 'float at the surface of the fluid', the present invention contemplates that a portion of the float will extend beneath the surface of the fluid, as this portion of the float will provide the sealing of the plug as the fluid falls to a level near depletion. The float is thus designed to seat when the fluid in the container decreases to a certain low level, when fluid is transferred from the container. In operation, ie, when fluid is being withdrawn from the container, the container is in a position with the mouth pointing downwards (or with the fluid passageway through the plug positioned in underlying registry with the reservoir of the container). The present invention contemplates that a transfer conduit will be attached to the plug so as to provide a fluid path from the reservoir to either a syringe or cartridge of an infusion pump or to a needle inserted into the vasculature of a patient. As the container is being emptied the float will follow the fluid surface towards the mouth of the container and the interior surface of the plug, i.e. the side of the plug facing the fluid in the container, such that the float will seat against the interior surface of the plug and thereby stop the flow out of the container before the container is completely emptied and air starts entering the tube or syringe used in the transfer. The shape of the float will vary depending on the shape and function of the plug and also on the shape of the neck of the container as well as on the shape of the interior surface of the plug. Further, the geometry and dimensions of the float may be selected depending on the fluid level corresponding to 'depletion' of the fluid within the container. That is, the term 'depletion' or to say the fluid is 'depleted' is intended by the present invention indicate a level of fluid within the reservoir of the container at which the float should be seated against the plug so as to close the passageway through the plug, and how much fluid should be left at that time. Similarly, the present invention will describe the container as 'emptied' when the fluid level has reached the level of depletion. The float of the present invention desirably has a circular cross section and preferably has the shape of a circular disc, a sphere, a cone or cone frustum.

In one embodiment, the plug is a stopper, e.g. as disclosed in the package of WO00/03920. When transferring sterile fluids from such package to a syringe, cartridge or an infusion pump, the stopper is typically pierced with a spike or alternatively the needle of a syringe. When piercing the stopper of the package of the invention, only fluid can be withdrawn as the float, floating on the surface of the fluid, will provide an air lock, preventing air from being withdrawn such as when the container becomes empty. At the same time the operator will clearly see the fluid level and hence know when to stop withdrawing or prepare for changing of the container. When the container is being emptied and the fluid surface approaches the mouth of the container wherein the plug is positioned, the float will provide a lock overlying the fluid passageway opening on the interior surface of the plug. The stopper preferably has a design that prevents the seating of float from being disrupted by the needle of the syringe inserted through the plug. For example, the present invention contemplates that the plug may define a passageway having a length which prevents the needle tip from protruding past the plug into the reservoir.

Alternatively, and preferably, the plug is a connecting plug. The connecting plug, and its corresponding plug seal, is herein named a combined plug. The functionality of the combined plug is that it both seals the container and can function as a connector between the container of the package and a delivery device. The connecting plug comprises a centrally located passageway extending through the plug body, the passageway having a first opening and second opening. The second opening is positioned towards the interior of the container, at the interior surface of the plug. The combined plug further includes a plug seal removably inserted into the first opening of the passageway of the connecting plug. Preferably, the connecting plug includes one part of a Luer taper connection, and this connecting plug can be connected with a mating Luer connection on a delivery device, such as an elongate conduit, providing mating Luer capability. The passageway of the connecting plug provides access to the fluid in the container, providing an improved functionality wherein the content of the container of the package can easily be transferred to a delivery device such as a syringe or cartridge. With the package of the invention including a float in the container, this float will lock the passageway of the connecting plug before the container is completely empty and will ensure that air is not transferred from the container to the delivery device. Additionally, with a transparent container, the operator will clearly see the fluid level and hence know when to stop withdrawing or prepare for changing of the container.

The connecting plug will generally be formed of an elastic material such as from plastics or elastomers, such as selected from thermoplastic polymer and from rubber, or from a combination of plastics and rubber. In one embodiment the plug comprises a coating to improve the ability to provide a tight seal between the inside of the container mouth opening and the plug, i.e. on the outer surface of the cylindrical body of the plug, when the plug is inserted into the mouth.

The connecting plug has a generally cylindrical body and the radius of the body is slightly greater than the radius of the inner surface of the neck of the container. This allows the body of the connecting plug to be an interference fit in the neck of the container. Alternatively to friction only, the plug can be cut threaded, glued or welded to the mouth of the container. The combined plug thus seals the container when the plug seal is positioned in the first opening of the passageway of the connecting plug, and this is positioned in the mouth of the container.

In one embodiment, the exterior surface of the body of the connecting plug is substantially planar, with the first opening of the passageway forming a centrally located aperture. The plunger body defines the first opening and the second opening, and the passageway extending in fluid communication between the first and second openings. In another embodiment, the passageway is defined by a protruding section, such as a cylindrical wall, extending from the exterior surface of the body of the connecting plug, wherein the centrally located passageway is located inside the protruding section and going throughout the body of the connecting plug. The free end of the protruding section defines the first opening and the interior surface of the plug body defines the second opening such that the passageway extends in fluid communication between the first and second openings. The protruding section is preferably an upstanding annular wall surrounded by an annular recess. Desirably, this annular recess may further be perimetrically bounded by either the neck of the container or by an outer annular wall of the plug extending along the neck of the container. In such embodiments the annular recess forms one portion of the upper surface of the body of the plug. The free end, or distal end, of the protruding section, and hence the first opening, may be substantially flush with, or coextensive with, the distalmost portion of the body of the connecting plug, such as an annular flange. Alternatively, the top surface of the protruding section may be either positioned lower or higher than the flange of the connecting plug. The flange forms another portion of the surface of the body. The optional protruding section thus forms a connecting portion of the connecting plug.

To prevent air being withdrawn from the container, the elements of the package may be constructed such that there is an interference fit between the lower side of the plug and the float, when the container becomes depleted. Preferably the float has a shape and size adapted to seat on the interior surface of the plug at the second opening of the passageway. The float is preferably selected from the group of a membrane disc, a ball, a cone or a frustum of a cone, all having a circular cross section and hence fitting the tubular or conical shape of the passageway of the plug. If the float is a membrane disc this is preferably soft and flexible and will overlie the second opening of the passageway when the container is almost empty. Preferably, the membrane disc comprises a solid annular rim about the flexible membrane, enabling that the membrane disc overlies the second opening of the passageway and seats there prior to all of the fluid flowing from the reservoir. If the float is a cone or a ball, these are adapted to fit into the second opening of the passageway, closing this. Preferably it is mainly gravity, geometry, the size and weight of the float that is decisive for its seating at the lower side of the plug when the container is depleted.

Alternatively, magnetic forces as well can be used to even better draw the float towards the passageway opening of the connecting plug to close this, and to better hold it there e.g. if the container is tilted off from vertical position. In this embodiment, the area around the second opening of the passageway of the connecting plug is preferably magnetic and the float includes a ferromagnetic material, such as metal, being attracted to the magnet. The float thus would include both the ferromagnetic material as well as a lighter material, such a polymer, such that the plug is buoyant in the fluid but able to be drawn towards a magnet as the fluid level nears depletion. It is contemplated that the ferromagnetic material may be metallic particles encased in the polymer of the float, a metallic core surrounded by a polymer shell, or a thin metallic shell about a polymeric core. The present invention further contemplates that the magnetic forces may be provided by the magnetic field of a magnet incorporated into the plug. In one embodiment, the area of the interior surface of the plug about the second opening is magnetic and the float includes, e.g. in the circumferential rim of the membrane disc, a metal being attracted to the magnet. The plug may thus include an annular magnet about the plug passageway, either on the interior surface of the plug, on the exterior surface of the plug, or encapsulated within the plug. The magnetic force thus will assist in seating the plug against the plug so as to seal the second opening of the passageway.

In a further embodiment of the invention, the package includes a guiding element for the float. Such element ensures that the float is guided towards the passageway of the plug as the level of the fluid is diminishing. The guiding element is either a part separate or integrated with either the container or the plug. In one embodiment, the container neck, extending towards the container mouth, has a shape that will lead the float towards the second opening of the passageway of the connecting plug. In another embodiment, the interior surface of the plug, pointing towards the interior of the container, includes the guiding element, integrated or separate, having a shape that leads the float towards the second opening of the passageway. In a preferred embodiment, the guiding element comprises a funnel, a cage or a grating, or combinations of these.

In a preferred embodiment the connecting portion of the connecting plug provides one part of a Luer taper connection. The Luer taper is a standardized system of small-scale fluid fittings used for making leak- and needle-free connections between a male-taper fitting and its mating female part. There are two varieties of Luer taper connections: Luer Lock and Luer Slip. Luer Lock fittings are securely joined by means of complementary threads and tabs on the two parts, and the two parts are twisted and locked together. Luer Slip fittings are pressed together and are held together by friction only, without any threads. The connecting portion of the connecting plug is formed such that it provides one part of a Luer taper connection either of the Luer Lock type or the Luer Slip type, or of both. The connecting portion of the connecting plug is formed to function as either the male or the female entity of such connection.

The connecting portion may thus be made suitable for use with either Luer Slip or Luer Lock connection parts of delivery devices. The passageway of the connecting plug is typically tubular or provided with conical geometry as the first or second opening. If the passageway is frustroconical, the plug body defines the first opening and the second opening, the body comprising an inwardly-facing frustroconical surface defining the passageway extending in fluid communication between the first and second openings. In the embodiment wherein the connecting portion includes a protruding section surrounding the passageway, the outwardly facing wall of this may be either substantially cylindrical or it has a frustoconical shape, i.e. it is tapered. If the passageway is tubular the outwardly facing wall of the protruding section is preferably tapered, and if the passageway is frustroconical the outwardly facing wall of the protruding section is preferably cylindrical.

The connecting plug can hence be formed to fit with different Luer taper connections. The passageway of the connecting plug may be located inside the protruding portion, providing the possibilities of either inserting the connecting part of a delivery device inside the passageway or alternatively threading it on the protruding section. The following alternatives for the Luer connection of the connecting plug are hence embraced:

The connecting plug may function as the female entity of the connection. In this alternative, the mating connecting part of the delivery device is inserted into the passageway of the connecting plug. In one embodiment, this female connecting plug is adjusted to fit with a Luer Slip connection, such as a slip-tip of a syringe, such that this can be inserted into the tapered passageway and the passageway firmly surrounds the Luer Slip, forming a sealing fit. In another embodiment, wherein the passageway is located inside a protruding section, the passageway is alternatively adapted to fit with a Luer Lock connection. In this embodiment, the upstanding annular portion preferably comprises a Luer Lock anchor. Such anchor may comprise one or more flanges located at the upper surface of the protruding section, i.e. at the rim of the first opening. In this embodiment, the connecting plug is adapted to fit with a Luer Lock connector of a delivery device, preferably having female taper fittings comprising threads matching the flanges of the upstanding annular portion of the connecting plug, such that this may be threaded into the protruding section, and twisted to securely mate the two parts together in a fluid-tight connection.

Alternatively, the connecting plug may function as the male entity of the connection. In this alternative, the passageway is located inside a protruding section, and the protruding section has an outwardly facing wall that has conical shape, i.e. it is tapered. In one embodiment this male connecting plug is adjusted to fit with a female Luer Slip connection such that the protruding section of the connecting plug can be inserted into such connection which will firmly surround the protruding section, forming a sealing fit. In another embodiment, the connecting portion is alternatively adopted to fit with a female Luer Lock connection, Luer slip fit or tube (straw/quill). In this embodiment, the upstanding annular portion has an outwardly facing wall that is tapered and preferably comprises screw threads. In this embodiment, the connecting plug is adapted to fit with a Luer Lock connector of a delivery device, preferably having female taper fittings comprising flanges matching the screw threads of the upstanding annular portion of the connecting plug, such that this may be threaded on the protruding section, and twisting together securely mate the two parts together in a fluid-tight connection.

The connecting plug of the invention can be adopted to fit with various delivery devices, and preferably to any such device comprising a Luer Slip or Luer Lock connection, either of the female or male type. Such delivery devices include, but are not limited to syringes, cartridges and connection tubes. Alternative connecting plugs are disclosed in EP11193737.1, and are herein incorporated by reference. Independently of the shape of the connecting portion of the connecting plug, the interior surface of the plug, i.e. the part facing the fluid in the container, should have a shape that matches the float such that the float will close the passageway when the container is depleted.

In the embodiment wherein the plug is a connecting plug, a plug seal provides a further part of the package. The plug seal, also called a tip seal, is adapted to close the first opening of the passageway of the connecting plug. The plug seal comprises one or more sealing portions and a grip portion. To access the connecting plug such plug seal has to be removed. The plug seal is adapted to match the connecting portion of the plug so as to provide a sealing fit. The plug seal is made of a plastic material, optionally elastic. If the sealing portion of the plug seal is to be inserted into the passageway of the connecting plug the seal is preferably made of an elastic material to provide optimal sealing. The sealing portion is either adapted to be inserted into the first opening of the passageway of the connecting plug, or it is threaded onto the free end of the protruding portion of the connecting plug, or alternatively it is designed such that it is both inserted into the first opening of the passageway and at the same time is threaded on the upstanding annular portion of the connecting plug. The sealing portion of the plug seal has a Luer connection mating with the Luer connectivity of the connecting plug. For these alternatives, the plug seal may be designed to be of the pull-off or twist-off type, hence it may have a taper shape, threads or tabs matching the Luer connectivity of the connecting plug. When the plug seal is removed the Luer opening is protected from contamination due to its preferred location in a recess in the connecting plug such that the free end of the protruding portion does not extend out beyond the distal-most portion of the plug.

In a further embodiment, the package includes a cap overlying the plug, such as the connecting plug and plug seal. The cap may further secure the plug in place in the mouth of the container or simply prevent access to the first opening of the passageway. Preferably, the cap is a screw cap and the container and the cap have complementary screw threads. This provides a simple and effective way of securing the cap on the container and securing the combined plug. It is further preferred that the cap be provided with a tamper-evident feature, to reduce the risk of fluid being administered from a package which has been opened and then reclosed. Such opening and reclosing can result in the fluid losing its sterility, or in adulteration or contamination of the fluid in some form. One suitable form of tamper-evident feature is a member removably attached to the cap, which must be detached from the cap before the cap can be removed from the container. The absence of the member is then a sign that the package has been opened at some time, and should not be used. The cap further comprises an annular skirt extending downwardly from the edge of a cover aperture. Preferably, detachably attached to the lower end of the skirt of the cap there may be a ring functioning as a tamper-evidencing element. The ring engages beneath a lip on the neck of the bottle. In order to remove the entire cap from the bottle, it is first necessary to detach the ring from the cap, and the detached ring makes it clear to the user that the package has been opened.

The cap comprises a removable portion which can be removed to gain access to the plug, such as the connecting plug and the plug seal. When such removable portion is removed, or partly removed, the plug seal can also be removed and the connecting plug can be connected to a connecting entity of a delivery devices. The removable portion is non-attachable once removed. The cap comprises a circular cover aperture defining a centrally-located passageway therethrough. The passageway of the cover aperture aligns in overlying registry with the upper surface of the combined plug, i.e. the surface extending from the flange of the body of the plug. Hence, the cap has a circular orifice above the upper surface of the combined plug. The cover aperture comprises an inner and an outer perimetrical rim, wherein the inner rim defines the circumference edge of the orifice of the cover aperture.

There are different alternatives covered for the removable portion of the cap, and the following removable portions are preferred alternatives: A flip cover, a tear off part and a membrane entity. The cap of the package of the invention may take the form as disclosed in applicant's patent applications no. WO 00/03920, EP11183296.0 and EP11193737.1 which are herein incorporated by reference.

The package of the invention may be filled with any liquids, but is preferably for use with a sterile liquid, such as a pharmaceutical composition. Most preferably, the package is for use with a contrast media. In one preferred embodiment, the package is delivered filled with the sterile fluid including the float.

Preferred embodiments of the invention will now be described by way of example only and with reference to the accompanying drawings, in which FIG. 1 schematically shows the package 10 of the present invention. Package 10 includes a container 20 having an open neck 22. Container 20 defines a fluid reservoir 24 and neck 22 defines an open mouth 26 in fluid communication with reservoir 24. A connecting plug 40 is inserted into mouth 26 so as to engage neck 22 and fluidically isolate reservoir 24 from the environment. Plug 40 includes opposed exterior and interior surfaces 41 and 44, respectively, and defines an elongate passageway 45 therethrough. Passageway 45 includes opposed first and second openings 47 and 49, defined by exterior and interior surfaces 41 and 44, respectively, which are in fluid communication with each other across passageway 45 as well as with reservoir 24. Package 10 further includes a plug seal 30 removably inserted into a passageway 45 of connecting plug 40, and a float 15 floating at the surface of the fluid 25 in the container. Container 20 is desirably formed from a transparent material, such as glass, or a semi-transparent polymer, such as a pharmaceutical-grade plastic, so as to allow a user to see the level of fluid 25 and float 15 in reservoir 24. In operation, package 10 is held such that reservoir 24 is in overlying registry with passageway 45, such that the top of the fluid level in reservoir 24 is above plug 40. As fluid 25 is withdrawn from reservoir 24, float 15 will fall with the fluid level towards second opening 49 of plug 40. As fluid 25 nears a level of depletion within reservoir 24, float 15 will come to rest across second open end 49 in a manner which seals second opening 49 and prevents further fluid or air to be withdrawn from reservoir 24. Float 15 is sized and shaped to seal second opening 49 when fluid 25 falls to a level near depletion, such level deemed to be the 'empty' or 'emptied' condition for the purposes of this description.

Figure 2A:
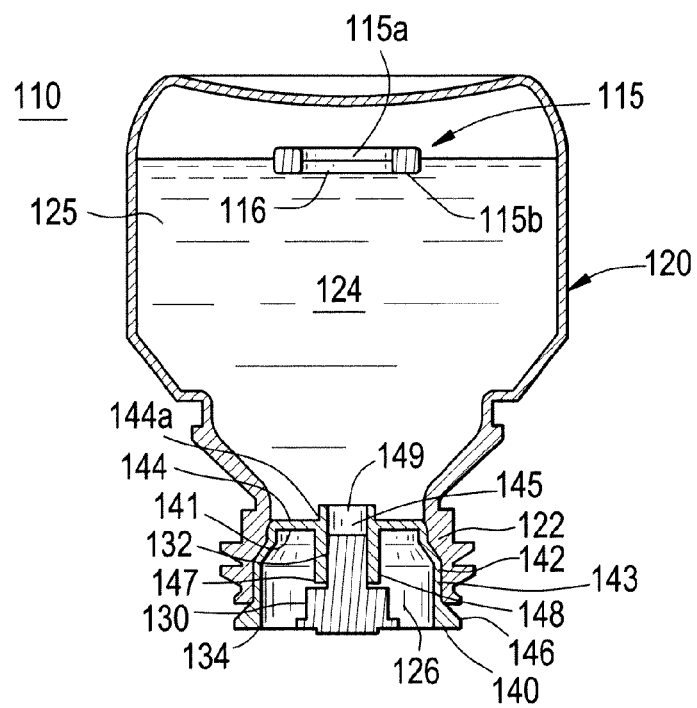
FIGS. 2a and 2b depict a cross-sectional view of another package of the present invention before and after being depleted, wherein the float is a membrane disc.
Figure 2B:
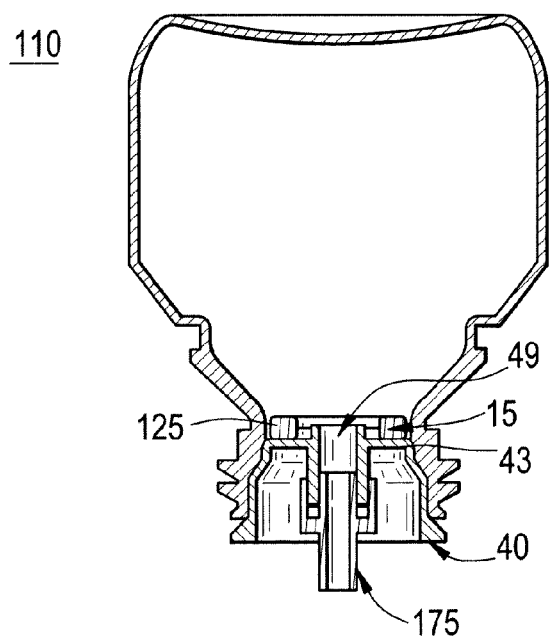

FIGS. 2a and 2b show a package 110 of the present invention. Package 110 is similar to package 10 such that similar numbering will denote similar components. Package 110 is depicted in FIGS. 2a and 2b in the unopened and emptied conditions, respectively, as noted by the differing levels of the fluid 125 therein. Package 110 is depicted in a dispense configuration where the reservoir 124 of product fluid 125 is in overlying registry with the fluid passageway 145 of connecting plug 140.

Package 110 includes a container 120 having an open neck 122. Container 120 defines a fluid reservoir 124 and neck 122 defines an open mouth 126 in fluid communication with reservoir 124. A connecting plug 140 is inserted into mouth 126 so as to engage neck 122 and fluidically isolate reservoir 124 from the environment. Plug 140 includes opposed exterior and interior surfaces 141 and 144, respectively, and defines an elongate passageway 145 therethrough. Passageway 145 includes opposed first and second openings 147 and 149, defined by exterior and interior surfaces 141 and 144, respectively, which are in fluid communication with each other across passageway 145 as well as with reservoir 124. Package 110 further includes a plug seal 130 removably inserted into a passageway 145 of connecting plug 140, and a float 115 floating at the surface of the fluid 125 in the container. Container 120 is desirably formed from a transparent material, such as glass, or a semi-transparent polymer, such as a pharmaceutical-grade plastic, so as to allow a user to see the level of fluid 125 and float 115 in reservoir 124. In operation, package 110 is held such that reservoir 124 is in overlying registry with passageway 145, such that the top of the fluid level in reservoir 124 is above plug 140. As fluid 125 is withdrawn from reservoir 124, float 115 will fall with the fluid level towards second opening 149 of plug 140. As fluid 125 nears a level of depletion within reservoir 124, float 115 will come to rest across second open end 149 in a manner which seals second open end 149 and prevents further fluid or air to be withdrawn from reservoir 124. Float 115 is sized and shaped to seal second open end 149 when fluid 125 falls to a level near depletion.

As shown in FIGS. 2a and 2b, connecting plug 140 has a generally cylindrical body 142, and the radius of the body is slightly greater than the radius of the inner surface of the neck of the bottle. This allows the body 142 of the connecting plug 140 to be an interference fit in the neck of a bottle. Body 142 includes an elongate perimetrical wall 143 supporting at its distal periphery a flange 146. Flange 146 past neck 122 of bottle 120 when the connecting plug 140 is fully inserted into mouth 126. Plug 140 includes an elongate cylindrical protruding portion 148 wherein the passageway 145 extends in fluid communication between a first opening 147 and a second opening 149 thereof. Float 115 includes a planar circular flexible membrane 115*a* with a solid annular rim 115*b*. Membrane 115*a* and rim 115*b* define a float cavity 116 opening in facing opposition to second opening 149 of plug 140. Interior surface 144 of plug 140 further includes an annular cylindrical projection 144*a* having an outer diametrical dimension which fits within the diameter of float cavity 116 and on which planar membrane 115*a* will seat when float 115 sealingly engages second opening 149 as the fluid level within 125 approaches depletion. In FIG. 2*a* a plug seal 130 is positioned in the passageway 145 of the connecting plug 140 sealing this. When plug seal 130 is attached to or into the distal end of a protruding portion 148 of connecting plug 140, passageway 145 is fluidically sealed. Plug seal 130 generally includes sealing portion(s) 132 and a grip portion 134, wherein sealing portion 132 matches the Luer connectivity of connecting plug 140. In FIG. 2*b* plug seal 130 has been removed and connecting plug 140 is coupled to a delivery device 175 (part shown) matching the luer connectivity of connecting plug 140, in order to allow directed withdrawal of fluid 125 from container 120. When the fluid level in container 120 is depleted, as shown in FIG. 2*b*, float 115 will position itself in sealing registry with second opening 149 of passageway 145 of connecting plug 140.

Figure 3A:
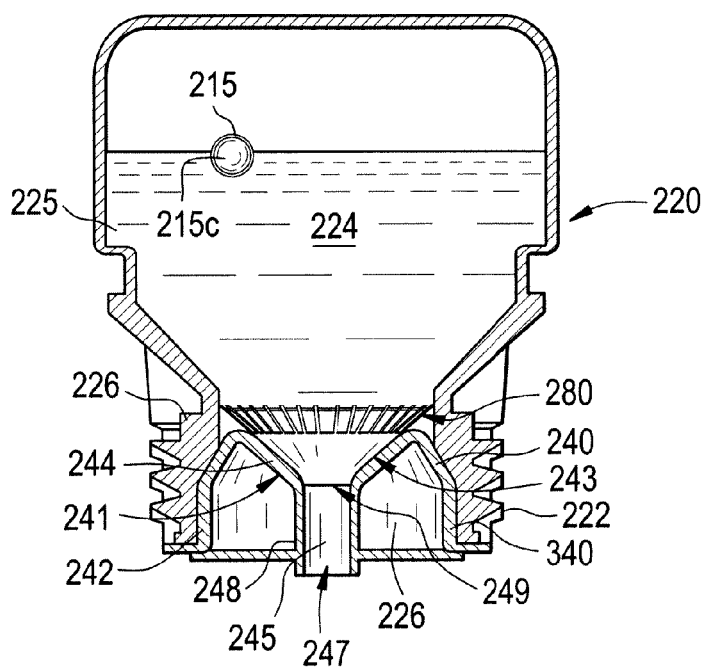
FIGS. 3a and 3b depict a cross-sectional view of yet another package of the present invention before and after being depleted, wherein the float is a sphere, and wherein the package includes a guiding element.
Figure 3B:
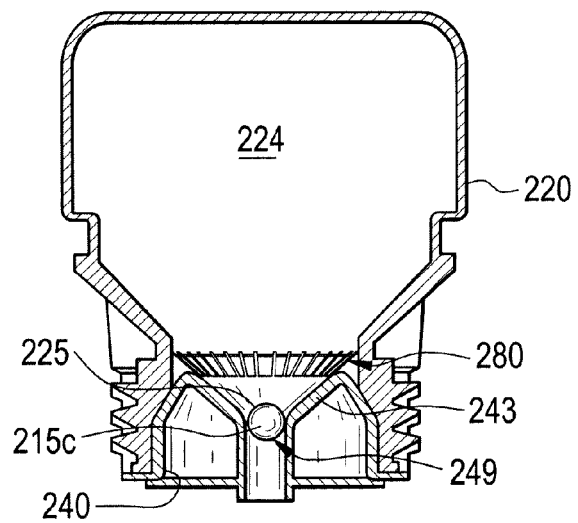

FIGS. 3*a* and 3*b* show a package 210 of the present invention. Package 210 is similar to package 10 and 110 such that similar numbering will denote similar components. FIGS. 3*a* and 3*b* depict package 210 in the filled and emptied versions, respectively, wherein the float 215 is a sphere 215*c*. Package 210 includes a container 220 having an open neck 222. Container 220 defines a fluid reservoir 224 and neck 222 defines an open mouth 226 in fluid communication with reservoir 224. A connecting plug 240 is inserted into mouth 226 so as to engage neck 222 and fluidically isolate reservoir 224 from the environment. Plug 240 includes opposed exterior and interior surfaces 241 and 244, respectively, and exterior surface 241 includes an elongate cylindrical protruding portion 248. Plug 240 and protruding portion 248 define an elongate passageway 245 extending in fluid communication between a first opening 247 and a second opening 249 thereof. The distal end of protruding portion 248 defines first opening 247 and interior surface 244 defines a second opening of passageway 245 so that each are in fluid communication with each other across passageway 245 as well as with reservoir 224. Additionally, interior surface 244 is desirably formed in the shape of a conical taper towards second opening 249. Package 210 further includes a plug seal, not shown, removably inserted into a passageway 245 of connecting plug 240, and a float 215 floating at the surface of the fluid 225 in the container. Container 220 is desirably formed from a transparent material, such as glass, or a semi-transparent polymer, such as a pharmaceutical-grade plastic, so as to allow a user to see the level of fluid 225 and float 215 in reservoir 224. In operation, package 210 is held such that reservoir 224 is in overlying registry with passageway 245, such that the top of the fluid level in reservoir 224 is above plug 240. As fluid 225 is withdrawn from reservoir 224, float 215 will fall with the fluid level towards second opening 249 of plug 240. As fluid 225 nears a level of depletion within reservoir 224, float 215 will come to rest across second open end 249 in a manner which seals second open end 249 and prevents further fluid or air to be withdrawn from reservoir 224. Float 215 is sized and shaped to seal second open end 249 when fluid 225 falls to a level near depletion.

Package 210 further includes a guiding element 280 for float 215, extending along the tapered interior surface 244 of plug 240 and second opening 249. In FIG. 3*a* plug seal 230 has been removed and the fluid is to be depleted, e.g. by connecting to a delivery device (not shown) such as a syringe, cartridge or connecting tube. In FIG. 3*b* sufficient fluid has been emptied from reservoir 224 that float 215*c* has been guided by guiding element 280 to be positioned in sealing engagement with connecting plug 240 at second opening 249 of passageway 245, thereby preventing further fluid or air from being drawn from package 210.

Figure 4A:
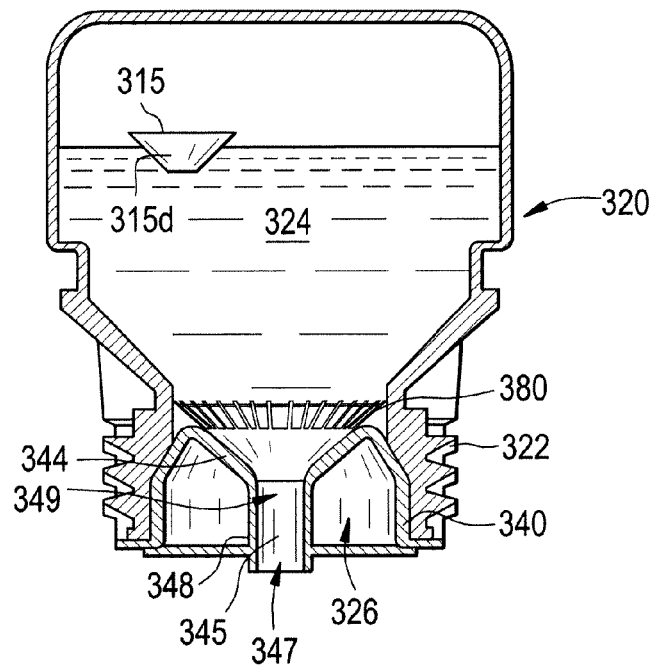
FIGS. 4a and 4b depict a cross-sectional view of still another package of the present invention before and after being depleted, wherein the float is a cone, and wherein the package includes a guiding element.
Figure 4B:
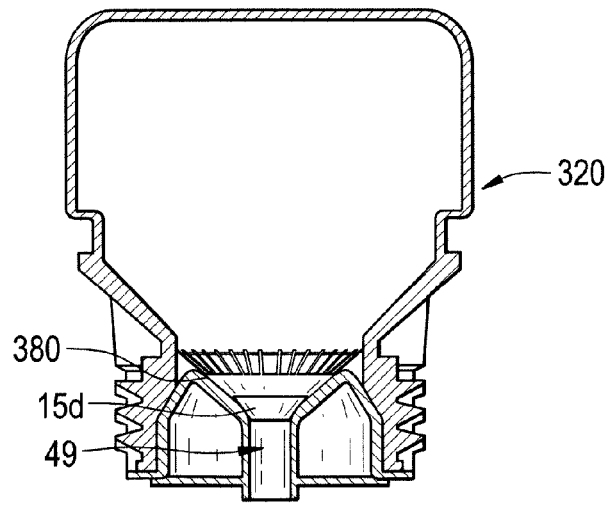

FIGS. 4*a* and 4*b* show a package 310 of the present invention. Package 310 is similar to package 10, 110, and 210 such that similar numbering will denote similar components. FIGS. 4*a* and 4*b* depict package 310 in filled and depleted conditions, respectively. Package 310 is depicted as having the same elements as the package 210 of FIGS. 3*a* and 3*b*, except that the spherical float 215*c* has been replaced with a float 315 which is a cone frustum 315*d* having dimensions which will sealingly engage connecting plug 340 to fluidically seal passageway 345 at second end 349, as shown in FIG. 4*b*. Package 310 includes a container 320 having an open neck 322. Container 320 defines a fluid reservoir 324 and neck 322 defines an open mouth 326 in fluid communication with reservoir 324. A connecting plug 340 is inserted into mouth 326 so as to engage neck 322 and fluidically isolate reservoir 324 from the environment. Plug 340 includes opposed exterior and interior surfaces 341 and 344, respectively, and exterior surface 341 includes an elongate cylindrical protruding portion 348. Plug 340 and protruding portion 348 define an elongate passageway 345 extending in fluid communication between a first opening 347 and a second opening 349 thereof. The distal end of protruding portion 348 defines first opening 347 and interior surface 344 defines a second opening of passageway 345 so that each are in fluid communication with each other across passageway 345 as well as with reservoir 324. Additionally, interior surface 344 is desirably formed in the shape of a conical taper towards second opening 349. Package 310 further includes a plug seal (not shown) removably inserted into a passageway 345 of connecting plug 340, and a float 315 floating at the surface of fluid 325 in the container. Container 320 is desirably formed from a transparent material, such as glass, or a semi-transparent polymer, such as a pharmaceutical-grade plastic, so as to allow a user to see the level of fluid 325 and float 315 in reservoir 324. In operation, package 310 is held such that reservoir 324 is in overlying registry with passageway 345, such that the top of the fluid level in reservoir 324 is above plug 340. As fluid 325 is withdrawn from reservoir 324, float 315 will fall with the fluid level towards second opening 349 of plug 340. As fluid 325 nears a level of depletion within reservoir 324, float 315 will come to rest across second open end 349 in a manner which seals second open end 349 and prevents further fluid or air to be withdrawn from reservoir 324. Float 315 is sized and shaped to seal second open end 349 when fluid 325 falls to a level near depletion.

Figure 5:
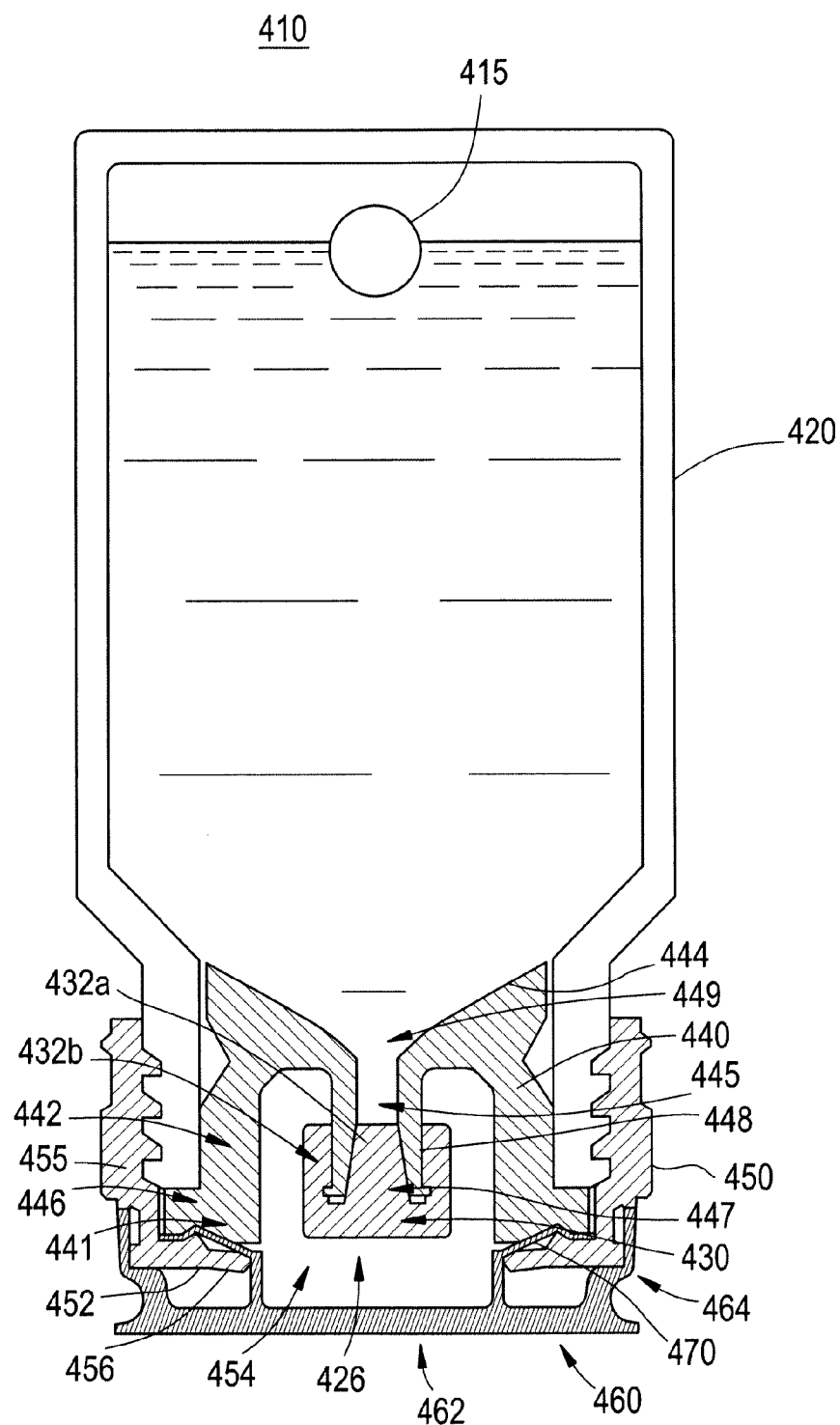
FIG. 5 schematically shows a cross-sectional view of even still another package of the present invention including a container filled with a fluid, and closed with a connecting plug, a plug seal and a cap overlying the connecting plug and plug seal. A float is floating at the surface of the fluid.

FIG. 5 shows a package 410 of the present invention. Package 410 is similar to package 10, 110, 210, and 310 such that similar numbering will denote similar components.

Package 410 includes a container 420, a connecting plug 440, a plug seal 430, a cap 450 and a float 415 floating in the fluid in the container. The cap 450 is attached to the upper part of the neck 426 of the bottle, overlying the connecting plug 440 and the plug seal 430. The present invention contemplates that cap 450 may be provided with any of the packages of the present invention.

Connecting plug 440 is positioned in the mouth 426 of the bottle 420. The body 442 of plug 440 has a flange 446 resting on the top of the neck of the bottle. The connecting plug includes a cylindrical protruding portion 448 defining elongate passageway 445 as well as a first opening 447 and a second opening 449 in fluid communication across passageway 445. Attached to the distal end of protruding portion 448 of connecting plug 440 is a plug seal 430. A sealing portion 432a of this is inserted into passageway 445, while another portion 432b releasably engages the outer surface of protruding portion 448, desirably using mating connecting elements. Connecting plug 440 includes a tapered interior surface 444, leading the float 415 towards the second opening 449 when the container 420 is being emptied to thereby seal passageway 445 prior to all of the fluid 425 being withdrawn from package 410.

As shown in FIG. 5, cap 450 has a cover aperture 452 which overlies the connecting plug 440, and an annular skirt 455 extending along the outer surface of container neck 426. Cover aperture 452 includes a radially-inwardly projecting perimetrical inner rim 456 defining the circumference edge of an orifice 454 of the cover aperture. In the example of FIG. 5, cap 450 includes a removable portion which is a flip cover 460. Flip cover 460 includes a planar circular disc 462 and a periphery wall 464 extending downwardly from the circular disc. Circular disc 462 overlays the cover aperture 452, including the orifice 454, of the cap 450 and lies in spaced registry with the protruding portion 448 of connecting plug 440. Extending downwardly from the lower side of the circular disc 462 of the flip cover 460 is a set of legs 470, being forced tightly between the upper surface 441 of the connecting plug 440 and the lower side of the cover aperture 452 of the cap.

The fluid in the container can easily and directly be transferred to a delivery device, e.g. a syringe, avoiding that air is withdrawn from the container. To use the package, the operator would open the flip cover 460 of the cap 450, remove the plug seal 430 and connect a delivery device, most typically a tubing for an injector, alternatively a syringe or a cartridge, having matching luer connectivity with that of the connecting plug, to the protruding portion 448 of the connecting plug. When extracting fluid through the injector system or drawing fluid with a syringe, the float will clearly show the fluid surface, which is helpful for the operation, and when the container is close to empty the float will position itself in the second opening 449 of the passage of the plug, closing the exit and ensuring that air is not withdrawn.

Figure 6:
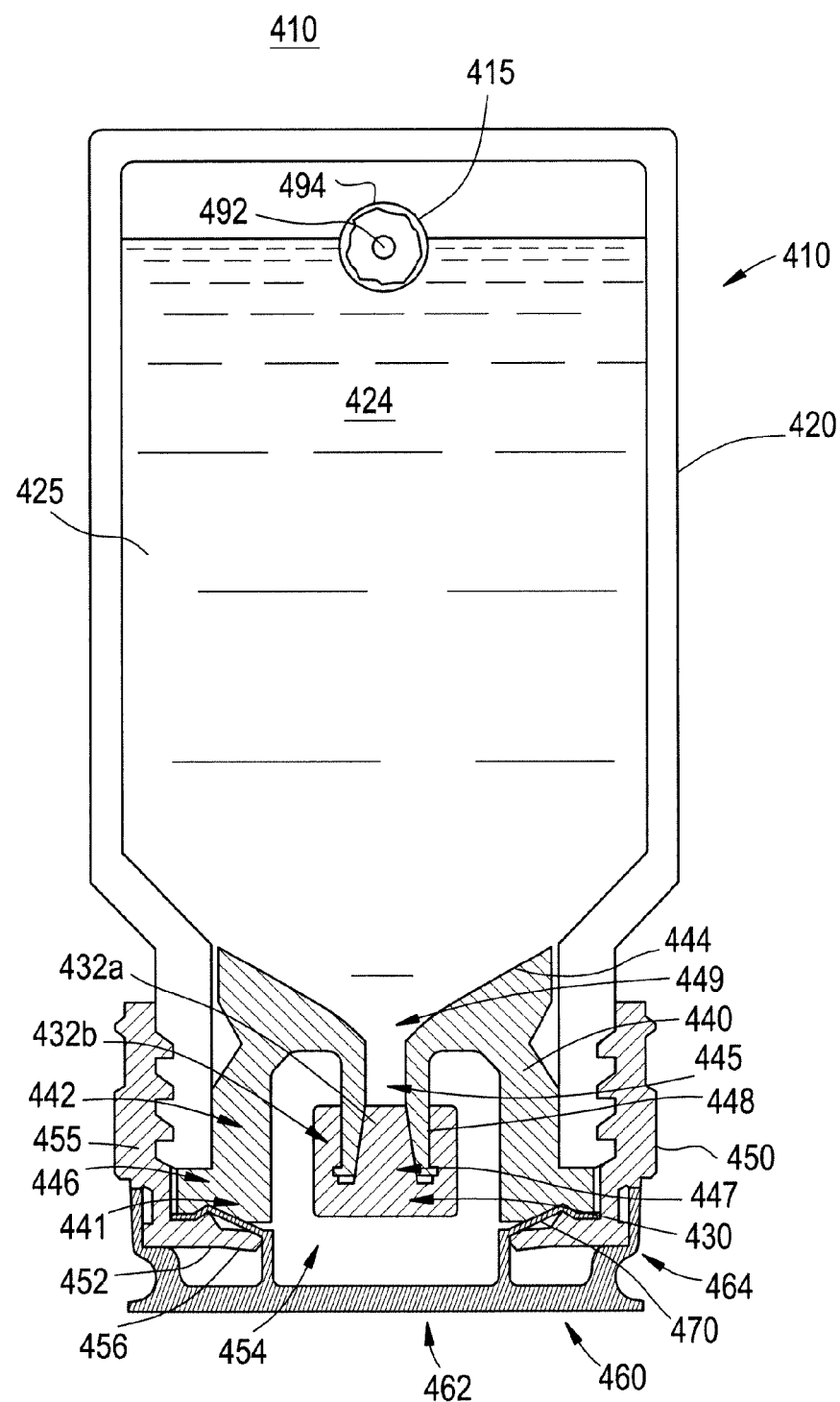
FIG. 6 depicts a cross-sectional view of yet still another package of the present invention where the float includes paramagnetic material and the connecting plug accommodates an annular magnet.

FIG. 6 depicts package 410 modified to further include an annular magnet 490 supported on exterior surface 441 about projection 448. Float 415 further includes a paramagnetic core 492 and a polymeric coating 494 about core 492. Core 492 imbues float 415 with the ability to be magnetically drawn towards magnet 490 while coating 494 is of a size and density to impart buoyancy to float 415 in fluid 425. Magnet 490 is a source of a magnetic field to attract float 415 towards second opening 449 so as to further assist sealing passageway 445. The strength of the magnetic field provided by magnet 490 is desirably selected to overcome the buoyancy of float 415 only as the fluid level nears depletion within reservoir 425 so as not to prematurely seal passageway 445. The present invention contemplates that magnet 490 may also be provided adjacent interior surface 444 or encapsulated within plug body 442 adjacent second opening 449. The present invention contemplates that by providing magnet 490 within plug body 442 or about the base of projection 448, no material issues will arise regarding the compatibility of magnet 490 with the sterile pharmaceutical fluid 425.

While the particular embodiment of the present invention has been shown and described, it will be apparent to those skilled in the art that changes and modifications may be made without departing from the teachings of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A package for a sterile pharmaceutical fluid, said package comprising:
    a) a container including a container body, said container body including an annular container neck, said container body defining a fluid reservoir and said container neck defining an open container mouth in fluid communication with said reservoir,
    b) a plug inserted into said mouth so as to span across said container neck and fluidically isolate said reservoir, said plug comprising opposed exterior and interior surfaces and defining an elongate fluid passageway therethrough, said fluid passageway comprising opposed first and second openings in fluid communication with each other and with said reservoir,
    c) a float residing inside the container, said float sized and shaped to seal said second opening of said fluid passageway when a fluid held within said reservoir falls to a level near depletion, when said fluid passageway is positioned in underlying registry with said reservoir,
    wherein the second opening is positioned towards the interior of the container and at the interior surface of the plug, and
    wherein the float is configured to provide a lock on the interior surface of the plug, and wherein the length of said fluid passageway is greater than the diameter of the second opening.

2. The package as claimed in claim 1, wherein the plug is a connecting plug inserted into said mouth, said connecting plug comprising a centrally located cylindrical wall defining said passageway extending through the plug body.

3. The package as claimed in claim 2, further comprising a plug seal removably inserted into the first opening of the passageway of the connecting plug.

4. The package as claimed in claim 3, wherein the plug seal comprises a sealing portion comprising Luer connectivity that removable mates with the Luer connectivity of the connecting plug.

5. The package as claimed in claim 2, wherein the connecting plug comprises one part of a Luer taper connection.

6. The package as claimed in claim 2, wherein there is an interference fit between a lower side of the plug and the float when a fluid held within said reservoir falls to the level near depletion, to close the second opening of the passageway of the connecting plug.

7. The package as claimed in claim 6, wherein said float is formed from a material comprising a ferromagnetic material and wherein said package further comprises a source of a magnetic field which further draws the float towards the second opening of the passageway of the connecting plug to assist in the sealing thereof.

8. The package as claimed in claim 2, further comprising a guiding element for the float, said guiding element having a shape that will lead the float towards the second opening of the passageway of the connecting plug as a fluid within the reservoir falls to the level near depletion.

9. The package as claimed in claim 8, wherein the guiding element for the float comprises one of a funnel, a cage, and a grating, or combinations of these.

10. The package as claimed in claim 2, wherein the connecting plug further comprises one of a male or female entity of a Luer Slip or Luer Lock connection.

11. The package as claimed in claim 2, wherein the passageway of the connecting plug is either tubular or it is provided with conical geometry at least one of said first and second openings.

12. The package as claimed in claim 1, wherein the float comprises a shape selected from one of a disc, a sphere, a cone, and a cone frustum.

13. The package as claimed in claim 1 further comprising a cap overlying said plug, said cap comprising a removable portion which can be removed to gain access to said plug.

14. The package as claimed in claim 13, wherein said cap further comprising tamper-evident features to identify whether it has previously been opened to allow access to said plug.

15. The package as claimed in claim 1, wherein said reservoir contains a sterile liquid.

16. The package as claimed in claim 1, wherein the plug is a stopper.

17. The package as claimed in claim 16, wherein the stopper is configured to prevent seating of the float from being disrupted by a delivery device inserted through the stopper.

18. The package as claimed in claim 17, wherein the delivery device is a syringe, a cartridge or a connecting tube.

19. The package as claimed in claim 1, wherein the passageway has a length configured to prevent a delivery device from protruding past the plug into the reservoir.

20. A package for a sterile pharmaceutical fluid, said package comprising:
   a) a container including a container body, said container body including an annular container neck, said container body defining a fluid reservoir and said container neck defining an open container mouth in fluid communication with said reservoir;
   b) a plug inserted into said mouth so as to span across said container neck and fluidically isolate said reservoir, said plug defining an elongate fluid passageway therethrough, said fluid passageway comprising opposed first and second open ends in fluid communication with each other and with said reservoir;
   c) a float residing inside the container, said float sized and shaped to seal said second end of said passageway when a fluid held within said reservoir falls to a level near depletion, when passageway is positioned in underlying registry with said reservoir,
   wherein the plug is a connecting plug inserted into said mouth, said connecting plug comprising a centrally located cylindrical wall defining said passageway extending through the plug body, and connecting plug comprises one part of a Luer taper connection.

* * * * *